United States Patent [19]

Bousquet et al.

[11] Patent Number: 4,857,622

[45] Date of Patent: Aug. 15, 1989

[54] SCALE AND SETTLEMENT INHIBITING AGENT FOR USE IN TREATING INDUSTRIAL AND/OR HOUSEHOLD WATER

[75] Inventors: Hubert Bousquet, Caluire; Georges Ravet, Craponne; Jacky Rousset, Chatillon sur Chalaronne, all of France

[73] Assignee: Coatex S.A., Caluire, France

[21] Appl. No.: 104,519

[22] Filed: Sep. 30, 1987

Related U.S. Application Data

[63] Continuation of Ser. No. 945,187, Dec. 22, 1986, abandoned, which is a continuation of Ser. No. 773,507, Sep. 5, 1985, abandoned, which is a continuation of Ser. No. 424,348, Sep. 27, 1982, abandoned.

[30] Foreign Application Priority Data

Oct. 20, 1981 [FR] France ............................. 81 19802

[51] Int. Cl.$^4$ ...................... C08F 20/04; C08F 120/18
[52] U.S. Cl. .............................. 526/317.1; 526/329.7; 525/201; 525/221; 525/222; 525/227; 210/701
[58] Field of Search ......................... 526/317.1, 329.7; 525/201, 221, 222, 227

[56] References Cited

U.S. PATENT DOCUMENTS

| | | | |
|---|---|---|---|
| 3,578,589 | 5/1971 | Hwa et al. | 210/701 |
| 3,968,059 | 7/1976 | Shimada et al. | 526/329.7 |
| 4,075,242 | 2/1978 | Rhum et al. | 526/329.7 |

Primary Examiner—Joseph L. Schofer
Assistant Examiner—N. Sarofim
Attorney, Agent, or Firm—Oblon, Spivak, McClelland, Maier & Neustadt

[57] ABSTRACT

An agent to be used to treat water and aqueous media contacting heat transfer surfaces for inhibiting the build-up of scale and settlement of dissolved alkaline earth materials in water and aqueous media, which agent consists of acrylic and methacrylic acid polymers and/or copolymers and is characterized in that it comprises the fraction of said polymers and/or copolymers having a symmetrical, single-mode molecular weight distribution centered on an average molecular weight of about 800, in which 100% of said molecular weights are individually lower than 1,200 and at least 90% of same are in the 400–1,000 range.

3 Claims, No Drawings

SCALE AND SETTLEMENT INHIBITING AGENT FOR USE IN TREATING INDUSTRIAL AND/OR HOUSEHOLD WATER

This application is a continuation of Ser. No. 06/945,187 —2/22/86—abandoned 10/24/87; which is a continuation of Ser. No. 06/773,507—09/05/85abandoned 02/13/87; which is a continuation of Ser. No. 06/424,348—09/27/82 —abandoned 10/11/85.

invention relates to an agent for inhibiting the build-up of scale and/or the settlement of dissolved alkaline earth materials, for use in the treatment of industrial and/or household water, which agent consists of acrylic and methacrylic acid polymers and/or copolymers.

This invention further relates to a method of treatment of water and aqueous media using said inhibiting agent to prevent the build-up of inorganic scale crusts in industrial and/or household installations in which such water or aqueous liquids are either still or circulating.

For a long time men skilled in the art have been confronted with the formation of inorganic scale crusts on heat transfer surfaces in industrial or household installations in which heat exchanges take place between a heating or cooling source and a receiving liquid, such as water or an aqueous phase, which is to be heated or cooled. Indeed, substantially all types of natural water and of industrial or household aqueous liquids contain some dissolved alkaline earth metals in salt form, particularly such as calcium and magnesium. Whenever such water or aqueous liquids are treated in heat exchangers such as e.g. hot water or steam generators, heat exchangers for cooling installations, distillation desalinization of sea water, dissolved alkaline earth salts are usually converted into insoluble salts the presence of which is made evident by the turbidity of the aqueous medium. These inorganic salts settle as inorganic scale crusts onto the heat transfer surfaces.

Thereafter the build-up of inorganic scale adhering to the walls of the installation impair the heat transfer capacity of said heat transfer surfaces between said heating or cooling source and said receiving liquid.

Furthermore, such build-up restricts the flow rate of the fluid to be heated or cooled, thus increasingly reducing the efficiency of the industrial or household installations.

In addition, such build-up may become so substantial as to cause in some industrial installations an obstruction of the heat transfer tube bundles and to require their dismantling, their descaling by mechanical or chemical means which strongly attack metals, or even their replacement.

Accordingly, it has been found that an essential requirement was to prevent or minimize the build-up of inorganic scale crusts on the heat exchange surfaces of industrial or household installations such as e.g. heat exchangers, hot water or steam generating boilers, steam turbines, vapor pumps and condensers, seawater distillation boilers of sea water, evaporators, air conditioners, in such a manner that said heat transfer surfaces will operate efficiently and economically by maintaining their heat transfer rate and thus will have an extended lifetime.

For a long time men skilled in the art have researched for all the adjuvants or aids which can play an efficient and critical role in inhibiting the build-up of scale crusts by feeding such aids in water or aqueous media.

Many aids have already been proposed to play this inhibiting role by feeding of same into the aqueous medium to be treated before said medium is subjected to a voluntary temperature change.

In specialized literature there are mentioned a great number of compositions for inhibiting scale build-up and settlement, and corrosion in some instances, e.g. compositions in which phosphorus compounds such as polyphosphates and polyphosphonates are combined with polycarboxylic acids such as polyacrylic and polymethacrylic acids.

As disclosed in French Patent No. 2,116,139, while polyphosphates lead to the build-up of soft, brittle scale crusts which can be easily removed from heat transfer surfaces, polycarboxylic acids or salts thereof result in hard, adhesive scale crusts which are more difficult to remove. Furthermore, in water treatment methods involving heat supply, polyphosphates become easily hydrolyzed at high temperatures, which restricts their activity. Therefore, said French Patent No. 2,116,139 teaches the use of hydrolyzed polymaleic anhydride having a molecular weight between 300 and 5,000 as a composition for inhibiting inorganic scale. However, this novel inhibiting composition has drawbacks which become evident both in its manufacture and its industrial application. Indeed, the preparation of this inorganic scale inhibiting composition is carried out by polymerizing maleic anhydride in an organic solvent which usually is toluene. This solvent being poisonous to humans, requires severe safety conditions in its industrial use. In addition thereto, as soon as the polymerization is completed, the resulting polymaleic anhydride is to be subjected to distillation for separating it from toluene, which even with a high-grade separation facility could leave traces of toluene therein.

In spite of the above-mentioned drawbacks, and for the purpose of increasing the efficiency of said inorganic scale inhibiting composition containing hydrolyzed polymaleic anhydride as its major component, French Patent No. 2,223,308 discloses a scale-removing or scale preventing synergic composition comprising a mixture of said polymaleic anhydride, and a polyarylic or polymethacrylic acid or salts thereof which are soluble in the aqueous medium to be treated. While such an improved composition is able both to inhibit the build-up of scale and to disperse any scale and sludge, it shows the same drawbacks as the above mentioned composition.

Finally, other inorganic scale and settlement inhibiting compositions which contain anionic polymers as major components are disclosed in prior art. For instance, U.S. Pat. Nos. 3,663,448 and 3,463,730 teach the use of polymeric agents having a molecular weight between 500 and 12,000 for preventing the deposition of adhesive scale crusts onto heat transfer metal surfaces on the one hand and the formation of haze or turbidity in the water or aqueous medium being treated on the other hand. Likewise, French Patent No. 2,415,079 discloses a scale and settlement inhibiting composition consisting of an acrylamide-based anionic polymer having a molecular weight between 500 and 12,000 which has an asymmetrical, two-mode distribution for providing such a two-fold scale and settlement inhibiting effect. Said asymmetrical distribution of molecular weight comprises at least 60 % of polymer having a molecular weight between 500 and 2,000, at least 10% of polymer having a molecular weight between 4,000 and 12,000 and at most 30% of polymer having a molecular weight between 2,000 and 4,000. In this composition, the scale inhibiting effect is substantially provided by the fraction of the anionic polymer having a molecular weight between 500 and 2,000 while the settlement inhibiting effect is provided by the fraction of the anionic polymer having a molecular weight between 4,000 and 12,000. However, the applicant has found that in numerous experiences of water and aqueous media treatment by means of such mixed agents for inhibiting scale and settlement, said agents consisting of anionic polymers having a two-mode and asymetrical distribution of the molecular weight thereof do not have the high efficiency which was expected from them. In other words, the settlement inhibiting effect has not been reliably ascertained for the fraction of the polymer having a molecular weight between 4,000 and 12,000 since it has not been confirmed by experimentation. Likewise, the scale inhibiting effect of the fraction of the polymer having a molecular weight between 500 and 2,000 has been found to be insufficiently efficient due to the formation of scale deposits on heat transfer surfaces a few hours after the feeding of the inhibiting composition into the aqueous medium to be treated.

Thus, prior art teaches solutions which result in the formation of either hard scale crusts or settlement and which are therefore not fully satisfactory since these various compositions for inhibiting scale crusts or settlement within the very medium to be treated do not have the desired efficiency as they merely delay the phenomena they should control. Accordingly, prior art does not provide any genuine solution to the increasingly frequent and important problem posed by the build-up of inorganic scale on heat transfer surfaces contacting water and aqueous media. An ineluctable consequence of this is a gradual but fast decrease in the heat transfer rate of said surfaces, which dictates increasingly costly operating conditions.

Due to the fact that the treatment of water and aqueous media so as to maintain the highest heat exchange capacity of industrial or household installations is both an economical necessity and a technical requirement, the applicant, after extensive research, has discovered and developed an agent for inhibiting the build-up of scale and settlement of alkaline earth materials which is highly efficient in the treatment of water and aqueous media originating from both industrial and household facilities and which has the desired essential qualities while overcoming the above mentioned drawbacks.

In accordance with the invention, the agent for inhibiting the build-up of scale and settlement of dissolved alkaline earth materials for use in the treatment of water and aqueous media in contact with heat transfer surfaces and consisting of the above mentioned acrylic and methacrylic acid polymers and/or copolymers is characterized in that said inhibiting agent-comprises only those polymers and/or copolymers having a symmetrical single-mode distribution of their molecular weight which is centered on an average molecular weight of about 800, 100% of said molecular weights being individually less than 1,200 and at least 90% of same ranging from 400 to 1,000.

Acrylic and methacrylic acid polymers and/or copolymers will be hereinafter referred to either by this term or by the term of "acrylic polymers and/or copolymers".

As already discussed, it is well known to use acrylic acid polymers and/or copolymers having a wide distribution of molecular weight, e.g. from 500 to 12,000, as agents for inhibiting the build-up of scale and settlement of inorganic materials in the treatment of water or aqueous media which are exposed to substantial temperature changes during heat exchange processes. These acrylic polymers and/or copolymers are prepared by known methods, i.e. by radical polymerization of acrylic acid in the presence of polymerization controlling agents such as, e.g. hydroxylamine-based organic compounds, and in the presence of polymerization initiating agents such as peroxides and persalts, e.g. hydrogen peroxide, persulfates and the like, and then by carrying out a complete or partial neutralization of the resulting polymerizate, if necessary.

However, in the course of extensive research for a really efficient method of treatment of industrial and household water and other aqueous liquids for inhibiting the build-up of scale and settlement of inorganic materials, the applicant has attempted to use such polymeric materials as inhibiting agents in the treatment of said water and aqueous media and found that the lower the average molecular weight of acrylic polymers and/or copolymers was, the higher the efficiency of such agents was. Accordingly, by carrying out numerous experiences on aqueous media treatment, the applicant has been able to ascertain that the only fraction of the acrylic polymers and/or copolymers which has the basic properties of an agent for inhibiting scale and settlement from aqueous media which are exposed to temperature changes is the fraction having a single-mode, symmetrical distribution of molecular weight centered on an average molecular weight of about 800, wherein 100% of said molecular weights are individually less than 1,200 and at least 90% of same are in the 400–1,000 range.

Thus, the applicant has been able to show the selective and distinctive feature of said fraction of acrylic polymers and/or copolymers as agents for inhibiting scale and settlement in the treatment of aqueous media as compared to the various fractions of the same polymers as taught in prior art, having a much broader distribution of molecular weight, e.g. ranging from 500 to 12,000 and being even of a two-mode, asymmetrical type.

The inhibiting agent in accordance with the invention, consisting of acrylic polymers and/or copolymers 100% of which have molecular weights distributed between 400 and 1,200, for use in the treatment of aqueous media to inhibit the build-up of scale and settlement of alkaline earth inorganic materials, may for example be isolated and extracted from the solution resulting from polymerization of acrylic and/or methacrylic acid by known methods. As soon as the polymerization in presence of the initiating and controlling agents well known to men skilled in the art is completed the resulting polymerizate aqueous solution can either be used as such or at least partially neutralized with a suitable agent such as sodium, potassium, ammonium or zinc hydroxides, or alternatively with aliphatic and/or cyclic primary, secondary or tertiary amines such as ethanolamines, ethylamines, cyclohexylamine or methylcyclohexylamine.

The polymerizate aqueous solution is then treated in accordance with methods known to men skilled in the art with a polar solvent or a mixture of polar solvents of the group comprising methanol, ethanol, propanol, butanol, isopropanol, acetone, tetrahydrofuran. This treatment results in a separation into two phases: a heavier aqueous phase containing the undesired fractions of acrylic polymers and/or copolymers, i.e. those portions containing polymers the molecular weight of which is practically higher than 1,200. This phase is discarded, whereas the lighter aqueous phase containing a major part of the polar solvent and the low molecular weight fraction of the acrylic polymers and/or copolymers is retained as being the aqueous media treating agent in accordance with the invention.

Thereafter, the polar solvent is removed by any means known by men skilled in the art, such as distillation for example, thus providing an aqueous liquid solution of acrylic polymers and/or copolymers containing the polymerizate portion which forms the inhibiting agent in accordance with the invention.

It is also feasible and it may be desirable in some instances to further refine the selection of the desired fraction of acrylic polymer and/or copolymers by treating again the previously recovered lighter aqueous phase. Practically speaking, it has been found advantageous to selectively isolate the fraction of acrylic polymers and/or copolymers the distribution of molecular weight of all of which is preferably in the 400-1,000 range.

The lighter aqueous phase containing the fraction of acrylic polymers and/or copolymers in accordance with the invention can be used as such as a treating agent for aqueous media exposed to temperature changes to inhibit the build-up of scale and settlement of originally dissolved alkaline earth materials. However, this phase may also be treated by any means known in prior art to remove therefrom the liquid phase consisting of a mixture of the polar solvent and water and isolate the acrylic polymers and/or copolymers in the form of a fine powder which can also be used in this other form as an aqueous media treating agent.

The temperature at which the step of isolation of said portion of acrylic polymers and/or copolymers is carried out is not critical per se since it affects only the partition ratio. In practice this selective isolation step is carried out at ambient temperature although it may be carried out at either higher or lower temperatures. The molecular weight of acrylic and methacrylic acid polymers and/or copolymers in accordance with the invention is determined by the so-called "gel permeation" method (GPC) which is well known to men skilled in the art, in a solvent medium such as tetrahydrofuran or in an aqueous medium.

However, such a determination may also be carried out by measuring the specific viscosity of said acrylic polymers and/or copolymers. In connection therewith, the applicant has been able to ascertain that the only fraction of the acrylic polymers and/or copolymers which has the basic properties of an efficient agent for inhibiting scale and settlement in the treatment of aqueous media is the fraction having a specific viscosity lower than 0.3.

The specific viscosity of the acrylic polymers and/or copolymers, which is designated by symbol "$\eta$", has been determined as follows:

A solution of acrylic polymer and/or copolymer is prepared in the form of a sodium salt by dissolving 50 g. (dry weight) of the acrylic polymer and/or copolymer into one liter of a solution of 60 g. of sodium chloride in distilled water. Then the flow time of a given volume of the above solution containing the sodium salt of the acrylic polymer or copolymer and the flow time of a same volume of an aqueous solution of sodium chloride free of said polymer and/or copolymer are both measured with a capillary viscosimeter placed in a temperature controlled bath at 25° C. Specific viscosity "$\eta$" can then be derived from the following relation:

$$\eta = \frac{\text{(flow time of the polymer solution)} - \text{(flow time of the NaCl solution)}}{\text{(Flow time of the NaCl solution)}}$$

The capillary tube of the viscosimeter is such that the flow time of the NaCl solution free of acrylic polymer and/or copolymer is about 90-100 seconds, thus providing very accurate measurements of the specific viscosity.

Finally, the agent for inhibiting the build-up of scale and settlement of dissolved alkaline earth materials for use in the treatment of aqueous media contacting heat transfer surfaces is fed into said media in an amount of from 1 to 100 p.p.m., preferably from 4 to 20 p.p.m.

The scope and advantages of the invention will be better understood from the following examples:

EXAMPLE 1

This example aims at illustrating all the experiments which have been carried out by the applicant under static conditions to achieve the selective isolation of the fraction of alkaline acrylic and methacrylic polymers and/or copolymers in accordance with the invention.

The tests carried out for this purpose were compart tests with prior art water treating agents all known to be inhibitors of scale and settlement and regarded as forming the closest prior art with respect to the treating agent in accordance with the invention.

Tests 1 to 4 relate to prior art whereas test 5 illustrates the subject matter of the invention.

The first test (test No. 1) uses a well known water treating agent consisting of an acrylic acid-isopropyl acrylate copolymer having an asymmetrical, single-mode molecular weight distribution between 200 and 20,000 centered on an average molecular weight of 5,000.

The second test (test No. 2) involves the use of a water treating agent comprising 85% by weight of sodium polyacrylate having an average molecular weight of 1,700 distributed between 500 and 2,500 and 15% by weight of sodium polyacrylate having a molecular weight of 8,000 distributed from 4,000 to 12,000. This test is carried out with a water treating agent for inhibiting scale and settlement the above composition of which forms an asymmetrical two-mode distribution as disclosed in French Patent No. 2,415, 079.

The third test (test No. 3) involves the use of another water treating agent widely commercially available for such use consisting of sodium polyacrylate having an average molecular weight of 1,700 but an asymmetrical, single-mode distribution of molecular weight between 500 and 12,000 of which 70 % are between 1,200 and 12,000 and 30% between 400 and 1,200.

The fourth test (test No. 4) involves a fraction of the sodium polyacrylate as described in test No. 3 which has been extracted by means of isopropanol according to the above described selective extraction method. This fraction having an average molecular weight of 2,200 distributed in the range from 1,200-12,000 range formed the heavier aqueous fraction while the lighter aqueous fraction according to the invention formed the treatment agent used in test No. 5.

The last test (test No. 5) involves the treating in accordance with agent the invention and uses sodium polyacrylate having an average molecular weight of about 800, of which 100 % of the weights of the individual molecules have a symmetrical single-mode distribution between 400 and 1,200.

In each of these tests, the applicant has used industrial water of common origin of which the alkaline earth salt content, more particularly the calcium content, was measured by forming ion $Ca^{++}$ complexes by means of a titrated solution of disodium salt of ethylene diamine tetraacetic acid (EDTA) in a buffered medium at pH 10, giving water hardness in French TH degrees (AFNOR standard NF-T 90 003).

Each of the tests was carried out in accordance with the same procedure involving the following steps:

Firstly, 5 p.p.m. (parts per million) of the treating agent were fed into the industrial water to be treated.

Thereafter, 250 milliliters of the water to be treated containing the treating agent were added to a one-liter flask equipped with a cooler.

Afterwards, the mixture of water and treating agent was heated to boiling by means of a flask heater the thermostat of which was so adjusted that boiling started after three minutes and was then maintained for 20 minutes.

Once the boiling period had elapsed, the 250 milliliters of water were cooled to 25° C. and then filtered on ash-free paper to remove the precipitate formed during the boiling.

Finally, the resulting filtrate was subjected to a further hardness measurement in French TH degrees. The value thus obtained was the final TH as measured after boiling in the presence of the treating agent.

In order to measure the efficiency of the water treating agent either of prior art or according to the invention, the applicant first carried out the measurement of the industrial water hardness prior to any treatment thereof; such hardness expressed as the water initial TH degree was 25° TH.

In order to make a reference available, there was carried out a control test made by subjecting the industrial water to a boiling treatment in the absence of any water treating agent according to the above procedure. The hardness of the control test sample was then measured after boiling on the filtrate as separated from the precipitate, which hardness was expressed as the control final TH degree.

The efficiency of each of the various treating agents as used in tests No. 1 to 5 was then measured by means of the following formula in percentage:

$$\% \text{ efficiency} = \frac{(\text{Final °TH after})(\text{boiling with})(\text{treating agent}) - (\text{Final °TH after})(\text{boiling without})(\text{treating agent})}{(\text{Initial °TH of})(\text{water before})(\text{boiling}) - (\text{Final °TH after})(\text{boiling without})(\text{treating agent})} \times 100$$

The results obtained in the tests with the various water treating agents and in the control test are reported in the following Table:

| Treating agent | Final °TH | % efficiency |
| --- | --- | --- |
| Without agent (control) | 6.4 | 0 |
| Test No. 1 | 11.8 | 29 |
| Test No. 2 | 12.8 | 34.4 |
| Test No. 3 | 13.4 | 37.5 |
| Test No. 4 | 10.2 | 20.4 |
| Test No. 5 in accordance with the invention | 16.3 | 53.2 |

Thus, as shown in the above table, the water treating agent in accordance with the invention has the highest efficiency as compared to prior art treating agents because it maintains the alkaline earth salts in solution for a longer time period.

EXAMPLE 2

In this Example, the applicant's purpose was to compare under dynamic conditions the efficiency of the water treating agent in accordance with the invention with respect to a prior art scale and settlement inhibiting agent such as the one disclosed in French Patent No. 2,415,079. The preferred composition of said prior art agent included 85% by weight of sodium polyacrylate having an average molecular weight of 1,700 distributed in the 500–2,000 range and 15% by weight of sodium polyacrylate having an average molecular weight of 8,000 distributed in the 4,000–12,000 range.

For this purpose, 200 liters of 25° TH hardness industrial water were added to a reaction vessel of the Grignard type, made of vitrified steel and provided with a jacket in which either a heat or cold conveying fluid could be circulated as desired. This vessel was equipped with an anchor-type stirrer rotating at 25 revolutions per minute, with a thermostat controlling the medium temperature at +65 °C. ±1 °C., and with a copper coil, the arrangement being such that only the scale inhibiting effects were observed independently from corrosion effects. The coil, having an effective length of 50 centimeters and an outer diameter of 12 millimeters was immersed in the industrial water volume and was heated, during the comparative tests, by means of steam under pressure of 5 bars.

In a first control test in which no treating agent was used the industrial water having the same origin and characteristics as in Example 1 (25° TH) was fed into the reaction vessel and then heated to the set temperature of 65° C.±1° C. within 30 minutes.

As soon as this step was completed, steam under pressure of 5 bars was blown into the copper coil while the industrial water was maintained at said set temperature throughout this step.

Both the surface condition of the heated coil and the water turbidity were watched through a porthole at one hour intervals. After 3 hours, the presence of a limy deposit on the underwater surface of the copper coil and the appearance of water turbidity were noted.

In a second test using the prior art inhibiting agent such as hereinabove defined, the water to be treated had the same origin and characteristics as in the control test.

5 p.p.m. of said agent (in terms of sodium polyacrylate) were fed into such industrial water at a temperature of 20° C. The water was then heated to the set temperature of 65° C.±1° C. within 30 minutes.

As soon as this step was completed steam under pressure of 5 bars was blown into the copper coil while the industrial water being treated was maintained at said set temperature throughout this step.

As above, both the condition of the heated coil and the water turbidity were watched through the porthole.

After 13 hours, the presence of a limy deposit on the underwater surface of the copper coil and the occurrence of water turbidity were noted. Thus, it was found that the prior art inhibiting agent reduced quite substantially the rate of scale build-up, thus showing good efficiency.

In a last test using the inhibiting agent in accordance with the invention, namely sodium polyacrylate having an average molecular weight of 800 of which 100 % of the molecules had a molecular weight less than 1,200, 5 p.p.m. of the agent (in terms of sodium polyacrylate) were fed into 200 liters of industrial water having the same origin and characteristics as in the previous tests. This water was subjected to the same operating conditions as in the previous tests. After operation for 24 hours, it was not possible to note any limy deposit on the underwater surface of the copper coil, nor the occurrence of any turbidity.

Accordingly, the inhibiting agent in accordance with the invention showed an efficiency substantially higher than that of the prior art inhibiting agent.

We claim:

1. An agent for use in the treatment of water and aqueous media contacting heat transfer surfaces for inhibiting the build-up of scale and settlement of alkaline earth material consisting essentially of polymers of a monomer solely selected from the group consisting of acrylic acid and methacrylic acid, said polymers having 100% of their molecular weights lower than 1200 at least 90% of their molecular weights within the range of 400–1000, the distribution of molecular weights of said polymers being a symmetrical single-mode distribution and centered on an average molecular weight of about 800.

2. A scale and settlement inhibiting agent as claimed in claim 1 in which said polymers have a specific viscosity lower than 0.3.

3. A scale and settlement inhibiting agent as claimed in claim 1, in which said agent is in the form of a powder.

* * * * *